United States Patent Office 2,853,514
Patented Sept. 23, 1958

2,853,514

PROCESS FOR THE PREPARATION OF AROMATIC CARBOXYLIC ACIDS

William F. Brill, Meriden, Conn., assignor to Olin Mathieson Chemical Corporation, New Haven, Conn., a corporation of Virginia No Drawing. Application July 22, 1955
Serial No. 523,920

8 Claims. (Cl. 260—524)

This invention relates to the catalytic oxidation of aromatic compounds characterized by a single aryl group having at least one methyl nuclear substituent, and provides an improved process for the efficient and economical conversion of suitable methyl-substituted benzenes to aromatic dibasic acids.

Earlier studies in this field have given rise to a variety of proposed processes for the catalytic oxidation of alkylated aromatic compounds in the liquid phase in the presence or absence of a solvent by means of air or oxygen using various metals or salts as catalyst. Also, a number of classes of organic compounds, such as peroxides, aldehydes, and ketones have been proposed as reaction initiators or activators.

In general, these proposals of the prior art involve stated or inherent disadvantages, mainly, conversion of only a small fraction, usually much less than half, of the starting material even after lengthy reaction periods; the simultaneous formation of other oxidized products, the removal of which may be difficult and requires additional steps and expense; the requirement for reaction conditions involving high temperature or high pressure or both; and the use of additional reagents which increases the cost of production. Where the desired product was a dibasic acid, the procedure generally involved successive steps, as for example, first the conversion of xylene to toluic acid and then the oxidation of the latter under more drastic conditions to the corresponding phthalic acid.

Accordingly, it is the main object of this invention to provide a process for the catalytic oxidation of methyl-substituted mononuclear aromatic compounds to form the desired aromatic acid in a single operation at high yields and with high degrees of conversion. Further objects include the provision of such a process which proceeds under mild reaction conditions; which yields directly products of high purity or having a small content of readily separable impurities; and which involves reaction conditions that are easily controlled and require a minimum of supervision.

The above and other objects are accomplished in accordance with this invention by carrying out the oxidation with the reacting materials and the operating conditions hereinafter described.

In carrying out a process of the invention, a methyl or polymethyl substituted mono-aryl compound to be oxidized is dissolved in a fatty acid having from 2–4 carbon atoms at a concentration of 0.1 to about 3 molar, that is, 0.1 to about 3 moles of the mono-aryl compound are present in each liter of solution. Preferably, the starting concentration is adjusted at between 0.5 to 2 molar for the attainment of best results such as optimum rates of reaction, high purity and yield of product, and maximum yield per hour from the apparatus employed. The preferred solvent is acetic acid, although excellent results are also obtained by substituting for the acetic acid, in whole or in part, either or both propionic and butyric acid. The dilute solution of methyl- or dimethyl-substituted aromatic compound must also include a small but significant content of water, ranging from 0.5 to 5 moles per liter of solution, in order to be operative in accordance with this solution. Solutions containing less than the minimum concentration of water, 0.5 molar, do not provide conditions for the proper functioning of the oxidation actalyst and activator described hereinafter. Insufficient solubility of the catalyst in such solutions results in an excessively lengthy induction period for the oxidation reaction as well as other complications. On the other hand, solutions which contain more than 5 moles per liter of water display such greatly decreased rates of the desired oxidation reaction as to be impractical for the intended purpose. Also, where the desired product is a dibasic acid, the higher water concentrations tend to decrease the solubility of intermediate oxidation derivatives and thus result in the contamination of the dibasic acid precipitated in the reaction mixture. Furthermore, when the oxidation is carried out batchwise, the water concentration should be maintained at less than 3 molar in order to avoid an unreasonably prolonged induction period.

The requirement for catalyst is that both cobaltous and cobaltic ion be present in amount corresponding to the initial provision of a cobalt salt soluble in the above solution, such as cobaltous acetate, propionate or butyrate to the extent of about 0.02 to 0.20 mole per mole of substituted aromatic compound, although a ratio of 0.05 to 0.12 gives best results. Thus, with the use of a 1 molar solution of the starting aromatic compound, the desired catalyst concentration may be supplied by the initial provision of about 0.02 to 0.20 mole, preferably 0.05 to 0.12 mole, of cobaltous acetate per liter of solution.

It is further important that a reaction activator be used in the solution consisting of a ketone or a diketone containing a methylene group adjacent the carbonyl, in a ratio of 0.1 to 0.5, preferably 0.2 to 0.3 of a mole per mole of mono-aryl compound to be oxidized. Methyl ethyl ketone is the preferred methylenic ketone and is outstandingly effective in the process of the invention. Other examples of methylenic ketones which may be employed are methyl propyl ketone, diethyl ketone, 2,4-pentanedione and 2,5-hexanedione.

Suitable temperatures for the oxidation process in accordance with this invention are within the range of 60° C. to about 110° C. at atmospheric pressure, although temperatures up to about 120° C. may at times be used at somewhat higher pressures up to about five atmospheres. The preferred operating temperatures are within the range of 70° to 100° C.

One further unforeseen feature of my process is the discovery that the operation requires the use of a gas sufficiently concentrated with respect to oxygen to provide a partial pressure of oxygen amounting to at least about 0.85 atmosphere. Thus, when the oxidation process is carried out at atmospheric pressure, the oxidizing gas must contain at least about 85% by volume of oxygen.

In referring to mono-aryl compounds it is to be understood that the preferred and most advantageously effective compounds are "methyl-substituted benzenes" including compounds such as toluene, xylenes, and derivatives thereof having additional nuclear substituents inert to the oxidation reaction.

Thus, the improved process is particularly advantageous for the oxidation of mononuclear aromatic compounds having one or more methyl nuclear substituents to form aromatic acids in which such methyl groups have been oxidized to carboxyl groups. The starting aromatic compounds may contain other aryl ring substituents inert to the oxidation reaction, such as chlorine, bromine, or fluorine, nitro, tertiary alkyl, carboxyl, or alkoxy. The process is especially advantageous for the production of aromatic dibasic acids by the oxidation of aromatic compounds containing a single aromatic nucleus having at least one methyl nuclear substituent and at least one other nuclear substituent which may be a carboxyl or a methyl group. Particular advantages arise in such oxidations in accordance with this invention when the desired dicarboxylic acid is insoluble in the reaction medium and can be separated by filtration, while the monocarboxylic acid and other intermediate oxidation products remain in solution so that their further oxidation can proceed at relatively high rates.

Reaction rate determinations have established both the optimum operating conditions within the limits specified above and also certain surprising features which were hitherto unknown and unsuspected. These will be described in detail by means of illustrative measurements made on the oxidation of p-xylene to terephthalic acid, in accordance with the following equation:

$$CH_3-C_6H_4-CH_3+3O_2 \rightarrow HO.CO-C_6H_4-CO.OH+2H_2O$$

Measurements were made of the rate of oxygen absorption under controlled reaction conditions and showed that the starting reaction mixture displays an initial induction period where the rate of oxygen absorption is relatively small. It was found that while the induction period can be shortened by a rise in temperature, the reaction rate is dependent in an unexpected manner on the temperature and on conditions provided during the induction period, so that within defined limits, the reaction rate can actually be increased by lowering the temperature.

The following values were obtained from experimental data at the indicated reaction temperatures using a solution in glacial acetic acid which initially was 1 molar with respect to p-xylene, 0.1 molar in cobaltous acetate, 0.2 molar in methyl ethyl ketone, and 0.5 molar with respect to water.

TABLE 1

| Temperature | Induction Period, hrs. | Total Time From Start of Reaction, hrs. | Yield of terephthalic acid (percent of theory) | Relative Rate |
|---|---|---|---|---|
| 100° C | 2.5 | 31 | 50 | 1.0 |
| 90° C | 6.0 | 50 | 90 | 1.8 |
| 80° C | 12.9 | 31 | 83 | 4.4 |
| 70° C | 27.1 | 59 | 63 | 4.9 |

The relative rates in the above table were obtained by evaluating K in the following equation:

$$\frac{d}{dt}(\text{p-xylene}) = K(\text{p-xylene})^2 = K\left(a-\frac{b}{3}\right)^2$$

where $t$=time from the start of oxygen addition, (p-xylene)=concentration of p-xylene, $a$=initial concentration of p-xylene, $b$=oxygen consumed at time $t$, and K corresponds to a second order rate constant under the given reaction conditions. The values were determined as the slope of the linear portion of the graphs of the reciprocal of p-xylene concentrations against time.

The values of the induction period were recorded from the same graphs, corresponding to the intersection of the straight line portion extended to the time axis.

Rate measurements carried out at 60° and 70° C., after an initial period of 3.5 hours at 100° C. in order to carry the reaction beyond the induction period, yielded results as follows:

TABLE 2

| Temperature | Induction Period | Relative Rate |
|---|---|---|
| 70° C | 3.5 hrs. at 100° C | 3.9 |
| 60° C | 3.5 hrs. at 100° C | 1.4 |

While a drop in the temperature from 100° to 90° C., from 90° to 80° C., and from 80° to 70° C. in each case was accompanied by an increase in the relative rate of the oxidation reaction, the 10° C. drop from 70° to 60° C. effected a decrease in the rate. At 70° C., the rate was slower after induction at 100° C. than after induction at 70° C.

The following table lists reaction rate data obtained at 90° C., using a solution in glacial acetic acid of p-xylene, cobaltous acetate, methyl ethyl ketone and water, at initial concentrations of 1.0, 0.1, 0.2, and 0.5 molar respectively. The results are typical of other isotherms in showing low absorption of oxygen during an initial induction period which is followed by a linear portion of the graph of reciprocal concentration of p-xylene against reaction time. The highest rates of oxygen absorption occur generally when 20–60% of the p-xylene has reacted, the maximum rate in this experiment being at 30–50%.

TABLE 3

| Reaction Time, minutes | Percent p-xylene Reacted | Oxygen consumed, moles per l. per minute × $10^4$ |
|---|---|---|
| 97 | 1 | 6 |
| 316 | 11 | 48 |
| 377 | 22 | 110 |
| 407 | 34 | 170 |
| 430 | 47 | 150 |
| 488 | 61 | 36 |
| 655 | 76 | 22 |
| 816 | 85 | 19 |

Kinetic data such as the above emphasize the fact that in earlier proposals in this field, the oxidation was attempted under inopportune conditions of slow rate, which in some cases was largely or entirely confined to the induction period because of low temperatures, and in others, to slow reaction rates because of temperatures that were too high.

The above data indicate the desirability at times of providing an induction period treatment for several hours at a higher temperature, for example, about 100° C. and then carrying out the main oxidation reaction at a lower temperature, for example at about 70°–80° C., particularly for batch-wise operation. In the case of continuous operation, the conditions of the reaction, including the proportions and concentrations of the reagents can be selected to provide optimum values of oxygen absorption, that is, the reaction mixture is maintained at a content of oxidation product equivalent to 20–60% of the compound being oxidized.

While some oxygen is consumed in the oxidation of the cobaltous salt present and of the ketone activator, the proportion is small enough so as to bear no significant effect on the kinetic measurements. However, in order to attain significant oxidation rates, catalytic cobalt salt must be present partly in the form of cobaltic ion, as generally indicated by the green coloration of the solution, and also the ketone must always be present in appreciable amounts. The indications are that complex equilibria are involved which govern the rate of the desired oxidation reaction and that the attainment of a high rate requires the simultaneous presence of cobaltous and cobaltic ions as well as of ketones and its intermediate oxidation products, probably including peroxidic compounds.

Kinetic studies have also substantiated the surprising feature, inherent in the foregoing data, of the similarity in the rates of oxidation of the two methyl groups in xylene. The concept, generally followed in the prior art, has been that the oxidation of the second methyl group requires much more drastic reaction conditions, which is now disproved. In fact, oxidation rate measurements made with toluene or p-toluic acid under similar conditions have yielded rate data of the same order of magnitude as those on xylene.

Further studies indicated little effect on the rate constants by doubling the ketone concentration from 0.1 to 0.2 molar. The oxidation of methyl ethyl ketone in the reaction medium omitting the hydrocarbon at a temperature of 100° C. yielded measurements indicating a first order reaction with a half life of 50 minutes. As the half life of p-xylene under oxidation at 100° C. amounted to over 700 minutes and at least several percent of the initial ketone concentration persisted throughout this reaction, the oxidation of the ketone was probably inhibited by the presence of the hydrocarbon.

This may well explain an important advantageous factor in the use of a ketone as activator rather than an aldehyde. Acetaldehyde, for example, is rapidly oxidized under the reaction conditions and additions must be made throughout the process, the total amounting to a molar excess over the hydrocarbon present. In contrast, the ketone amounts to a molar fraction of the hydrocarbon and may all be added to the initial reaction mixture.

Determinations of cobaltic ion concentration in reaction mixtures of this invention, supplied initially with 0.1 molar cobaltous salt, were made at different temperatures and at varied stages of partial completion of the reaction. The concentrations found varied between about 0.01 and 0.06 molar, with some indication of a correlation between the higher values of concentration and high reaction rates.

Kinetic measurements were also made to study the effect of water content on the reaction. At 100° C., an anhydrous solution of the reagents displayed only a slight initial rate of oxygen absorption, corresponding to an impractically long induction period, with separation of part of the cobalt salt catalyst in insoluble form. Between moisture contents of about ½ and 3 molar, useful induction periods and reactions rates were attained, although increasing amounts of water in the reaction mixture had some retarding effect. Higher concentrations of water caused more pronounced retardation such that at above 5 molar concentration, almost complete inhibition of the oxidation resulted at 90° C. and 100° C. While solutions of 0.5 to 5 molar content of water are applicable for continuous processes, the water concentration should be maintained at 0.5 to 3 molar for batchwise oxidation in order to avoid extended induction periods.

The following specific examples provide illustrative embodiments of the oxidation of methyl-substituted benzenes to form mono-aryl carboxylic acids in accordance with this invention.

*Example 1*

92.1 g. (1 mole) of toluene, 12.45 g. (0.05 mole) of cobaltous acetate tetrahydrate, 14.4 g. (0.2 mole) of methyl ethyl ketone, and 500 ml. of glacial acetic acid were mixed in a 1 l. three-necked flask equipped with a high-speed stirrer, a condenser and gas inlet tube. The acetic acid used in this example and those which follow contained 0.3 to about 0.5% water, furnishing sufficient water with that added with other reagents so that the initial water content of the reaction solution was adjusted as between 0.5 and 1.5 moles per liter. The solution was stirred rapidly and maintained at a temperature of 90° C. while commercially pure oxygen was passed in at a rate such that off gas from the condenser was maintained at a rate of 8 cc. per minute at atmospheric temperature and pressure. The initially purple solution turned green after two hours. After total reaction time of 24 hours, the reaction mixture was cooled and diluted with 1200 ml. of water. The flocculent white precipitate was filtered, washed with cold water, and dried at 90° C. in a vacuum dessicator. The dried product consisted of 109 g. of benzoic acid in the form of white crystals having a melting point of 121–121.5° C. and the theoretical neutral equivalent (122). Also, 26.6 g. of benzoic acid of good purity were recovered from the filtrate by neutralizing with sodium hydroxide, then acidifying with hydrochloric acid, and filtering. The total yield of product amounted to 89% of the theoretical.

The foregoing results show that the mild reaction conditions in accordance with this invention enabled the conversion in one operation of 89% of the toluene to benzoic acid, in contrast with the 50% or less conversion obtained in accordance with the teachings of U. S. 2,245,528; 2,276,774; 2,479,067 and 2,673,217.

*Example 2*

1 l. of solution containing 106 g. (1.0 mole) of p-xylene (98% purity), 24.0 g. (0.1 mole) of cobaltous acetate tetrahydrate, 21.6 g. (0.3 mole) of methyl ethyl ketone and 900 ml. of glacial acetic acid (99.5%) was placed in a stainless steel flask fitted with a thermometer, high-speed stirrer, reflux condenser and a gas inlet. The solution was thoroughly agitated and heated to 90° C. Commercially pure oxygen gas was passed into the flask through the gas inlet just above the surface of the solution to maintain an off gas rate leaving the condenser of about 40 cc. per minute at atmospheric temperature and pressure. The temperature was maintained at 90° C., cooling being required at about the 6 hour point because of the heat of reaction. After a total reaction time of 24 hours under the above conditions, the flow of oxygen was discontinued and the solution was cooled. The precipitate of terephthalic acid was filtered and washed with 500 ml. of water and, if desired, with 50 to 100 ml. of ethanol or acetic acid or both. A yield of 154 g. (93% of theoretical) of terephthalic acid of excellent purity was obtained, analysis showing a neutral equivalent of 83, in agreement with the calculated value.

Excellent yields of terephthalic acid of high purity were likewise obtainable at lower reagent concentrations as previously specified. However, the induction period was unduly prolonged when low ratios of catalyst were used and became extended to impractical limits with the use of less than 0.02 mole of cobaltous acetate per mole of p-xylene. With ratios of activator lower than 0.1 mole per mole p-xylene, the rate of oxidation was considerably decreased toward the end of the reaction.

Reagent concentration higher than those in the above example were also employed with advantageous results. However, at p-xylene concentrations greater than about 3 molar, the resulting terephthalic acid contained considerable p-toluic acid. Ratios of catalyst and activator greater, respectively, than 0.2 and 0.5 mole per mole of p-xylene are generally insufficiently advantageous to justify the resulting increase in consumption of chemicals. Higher ratios of catalyst and activator result in losses of catalyst in the product and of activator in the exit gas.

Attempts to substitute other metal salts, heretofore proposed as oxidaion catalysts, met with little or no success. For example, when 0.1 molar nickelous acetate hydrate (24.9 g. per liter of solution) was substituted for cobaltous acetate in the above procedure, it was found that no oxygen was absorbed for the first seven hours and only a negligible volume was absorbed in twenty-four hours, without producing any precipitate. When nickelous acetate was substituted for half of the cobaltous salt, the results were comparable to those obtained using 0.05 molar cobaltous salt alone. Likewise, substitution of manganous acetate for the cobalt salt in the above procedure resulted in the absorption of 0.35 cubic foot of oxygen in the first five hours but no further absorption in the next twenty-three hours and without the formation of any precipitate.

Unsatisfactory results were likewise obtained in attempts to substitute oxygen-nitrogen mixtures at atmospheric pressure containing less than 85% by volume of oxygen. When air was substituted for oxygen in the above procedure, the rate of oxidation was greatly reduced and only slight yields of product were obtained. Even when the reaction was initiated with oxygen for 160 minutes and air was passed through the reaction mixture for 48 hours, the yield of terephthalic acid was only 6.5% of theoretical. Similarly, the substitution of an oxygen-nitrogen mixture containing 74% by volume of oxygen resulted in prolonging the induction period to 16.9 hours and in a yield of terephthalic acid amounting to only 17% of theoretical after thirty-three hours. However, good rates and yields resulted with the use of gas containing more than 85% oxygen. For example, the use of gas containing 90% by volume of oxygen in the above procedure resulted in a relative rate of about 56% of that in the above example and in a yield of terephthalic acid which was 88% of the theoretical.

The procedure of the above example has been carried out on a larger scale with excellent results, similar with respect to yield and purity of product to those described above. The initial solution consisted of 6.0 lbs. of p-xylene (95% purity), 1.42 lbs. of cobaltous acetate tetrahydrate, 1.23 lbs. of methyl ethyl ketone and 51.0 lbs. of glacial acetic acid, providing a total water content in the solution of 0.67 lb. The following table indicates results of a number of runs, in which the reaction temperature was maintained at 90° C. except for brief intervals at the indicated maximum, gaseous oxygen being supplied at the indicated pressure.

TABLE 4

|  | A | B | C | D | E |
|---|---|---|---|---|---|
| Pressure of oxygen (lbs. per sq. in gauge) | 1.0 | 1.4 | 15.0 | 15.4 | 24.8 |
| Maximum temperature, ° C. | 102 | 94 | 95 | 104 | 114 |
| Stirring Rate, R. P. M. | 1,230 | 1,220 | 740 | 1,250 | 1,190 |
| Yield of terephthalic acid, percent of theoretical | 89 | 89 | 91 | 89 | 88 |

The total reaction period in the above runs was 24 hours with indications that shorter periods could have been used with essentially equivalent results at the higher oxygen pressures. In these runs (C, D and E), increased evolution of heat following the induction period showed that the increase in oxygen pressure resulted in a higher rate of oxidation. Thus, operation of the process under pressure on a commercial scale would require provision for more cooling during the period of maximum oxygen absorption or the use of oxygen containing an inert diluent such as nitrogen. In the latter case, the volume percent of oxygen may be decreased as the pressure is raised, with the partial pressure of oxygen being maintained at above 0.85 atmosphere.

*Example 3*

250 ml. of a solution in glacial acetic acid, containing 34 g. (0.25 mole) of p-toluic acid, 6.2 g. (0.025 mole) of cobaltous acetate tetrahydrate, and 1.8 g. (0.025 mole) of methyl ethyl ketone were placed in a reaction flask fitted with a thermometer, condenser and stirrer. Oxygen gas was passed into the flask at about atmospheric pressure over the solution for 31 hours, while the solution was stirred vigorously and maintained at a temperature of 90° C. Through volume measurements of the inlet and exit gas, it was noted that rapid consumption of oxygen began after the first ten hours of the reaction period. Filtration of the reaction mixture and washing and drying of the product gave 34.1 g. (82% of theoretical yield) of terephthalic acid.

*Example 4*

300 ml. of a solution in glacial acetic acid of 21.1 g. (0.15 mole) of chloroxylene (1,4-dimethyl-2-chlorobenzene), 4.3 g. (0.06 mole) of methyl ethyl ketone, 2 ml. of a 60% solution of methyl ethyl ketone peroxide in dimethyl phthalate (sold by Lucidol Division of Wallace and Tiernan as "Lupersol DDM"), and 7.5 g. (0.03 mole) of cobaltous acetate tetrahydrate, was thoroughly agitated and maintained at 90° C. while oxygen gas was passed through as in the preceding examples for 24 hours. The insoluble product was filtered, washed with water and dried, yielding 22.7 g. (76% of theoretical) of chloroterephthalic acid of excellent purity, the neutral equivalent being 100. The dimethyl ester was prepared in 82% yield by heating the acid in the presence of excess methanol saturated with HCl for four hours and had a melting point of 56°–58° C., in agreement with the value of about 60° C. reported in the literature.

*Example 5*

300 ml. of a solution in glacial acetic acid of 31.8 g. (0.3 mole) of m-xylene, 7.5 g. (0.03 mole) of cobaltous acetate tetrahydrate and 4.3 g. (0.06 mole) of methyl ethyl ketone was maintained at 90° C. and stirred at about 1,000 R. P. M. Gaseous oxygen was passed over the solution surface at a rate such as to maintain an exit gas volume of about 11 ml. per minute. The volumes of inlet and exit gas were measured, the difference giving the amount of oxygen absorbed in the reaction. Initially, the rate of oxygen absorption increased slowly for about 6 hours and then increased rapidly, the reaction becoming exothermic. A precipitate appeared in the reaction mixture at about 8 hours after the start and increased in amount as the reaction progressed, while the rate of oxygen absorption decreased. After the reaction had been allowed to proceed for a total of 26 hours, the reaction mixture was cooled to room temperature and the white crystalline product was filtered, washed with water, and dried at 100° C. for 24 hours. The yield of excellent product was 45 g., 90% of the theoretical, shown by analysis to have the calculated neutral equivalent (83).

*Example 6*

600 ml. of a solution in glacial acetic acid of 83 g. (0.75 mole) of mixed xylenes, containing 17.6% by weight of p-xylene and 82.4% by weight of m-xylene, 18.7 g. (0.075 mole) of cobaltous acetate tetrahydrate, and 21.6 g. (0.3 mole) of methyl ethyl ketone was treated with excess oxygen gas as in the preceding examples while the solution was agitated and maintained at a temperature of 100°–105° C. After a total reaction time of 24 hours, the solution was cooled and filtered. The white crystalline product, after washing with water and drying at 105° C. weighed 87.3 g. (70% of theoretical) and displayed the calculated neutral equivalent (83).

The filtered reaction solution was added to 83 g. of the same xylene mixture and 21.6 g. of methyl ethyl ketone. Treatment with gaseous oxygen as described above resulted in the precipitation and isolation of 121 g. (97% of theoretical) of excellent dibasic acid similar to the above.

*Example 7*

300 ml. of a solution in glacial acetic acid of 31.8 g. (0.3 mole) of an 85:15 mixture of m- and p-xylene, 7.5 g. (0.03 mole) of cobaltous acetate tetrahydrate, and 4.3 g. (0.06 mole) of methyl ethyl ketone was stirred rapidly at 90° C. Gaseous oxygen was passed in contact with the stirred solution so as to maintain an exit gas rate of 10–15 ml. per minute. After 24 hours, the solution was cooled, the product was filtered, washed with water and dried at 75° C. for 48 hours. The dry product weighed 46.2 g. (92.5% of theory) and displayed the calculated neutral equivalent (83).

The product was converted to an aqueous solution of the sodium salts of the mixed acids and the solution was treated with barium nitrate solution to precipitate barium terephthalate, which was separated by filtration. Acidification of the filtrate yielded 34.6 g. of isophthalic acid, while the insoluble barium salt yielded 8 g. of terephthalic acid after digestion with hydrochloric acid.

*Example 8*

The following example illustrates a procedure, offering certain advantages of batch-wise operation, in which the induction period is shortened by carrying it out at a high temperature within the operative range and the main oxidation process is then effected at a lower temperature at which the rate of oxidation is greater.

The materials used were as follows:

106 g. (1.0 mole) of p-xylene (95 to 98% purity)
24.9 g. (0.1 mole) of cobaltous acetate tetrahydrate (analytical reagent grade)
21.6 g. (0.3 mole) of methyl ethyl ketone
900 g. (15 moles) of glacial acetic acid (99.5% purity)
3.5 cubic feet of oxygen (commercial purity compressed gas)

The solution was placed in a 2 l. glass vessel provided with a paddle stirrer, a gas inlet tube, thermometer and condenser, and heated to 100° C. during thorough agitation. Oxygen was passed through the solution at a rate such as to provide 30 to 40 cc. per minute of off gas at 100° C. for 4.5 hours. The solution, now dark green, was cooled to 70° C. and maintained at that temperature by heating or cooling, as necessary. Considerable cooling was required at this stage, at which the reaction rate and oxygen consumption increase enormously. The oxygen rate was adjusted to provide an off gas rate of 10 to 15 cc. per minute for the remainder of the reaction at 70° C.

Oxygen absorption became slow after about 8 hours from the start of the reaction, at which time the reaction was about 75% complete.

After a total reaction time of 24 hours (4.5 hours at 100° C. and 19.5 hours at 70° C.), the reaction mixture was cooled and the crystalline precipitate was separated by filtration, the filtrate being saved for re-use. The product was washed with water and dried at 100° C. It consisted of terephthalic acid of excellent purity, having the calculated neutral equivalent of 83, suitable for the preparation of ethylene terephthalate polymer of high quality. The amount corresponded to 93% of the theoretical yield.

The filtrate obtained on filtration of the product from the reaction mixture was re-used by adding fresh p-xylene and methyl ethyl ketone and following the oxidation procedure as described above. Such re-use of the filtrate minimizes the cost of production by avoiding waste of the catalyst and of acetic acid. It can be repeated by maintaining the water content of the solution at between about ½ and 3 molar. As water is one of the oxidation products, water must be removed periodically from the filtrate in such a procedure. This can readily be accomplished by distillation, which also serves to remove excess amounts of acetic acid. The distillation can be carried out efficiently in the presence of a solvent such as benzene which forms an azeotrope with water. Likewise, water can be removed by maintaining the solution for a suitable length of time in contact with a solid absorbent such as silica gel or dehydrated gypsum, which has been prepared for selectively taking up water, before re-cycling to the reaction vessel. Such water removal is carried out periodically in the case of a batch-wise process and continuously, after filtration of the product, in the case of a continuous process.

Other methyl-substituted benzenes as above defined may be oxidized efficiently to provide high yields of the corresponding aromatic carboxylic acids of excellent purity in accordance with the essential conditions which have been described. Such procedures, as indicated previously, are particularly advantageous for the preparation of dibasic acids such as terephthalic acid and suitably substituted terephthalic acids.

I claim:

1. Process of forming an aromatic carboxylic acid comprising providing a dilute solution in a lower fatty acid having 2–4 carbon atoms of a mono-aryl compound having at least one methyl nuclear substituent, said solution initially containing from 0.1 to about 3 moles of the mono-aryl compound per liter, 0.5 to 5 moles of water per liter and a cobalt salt of said fatty acid in a ratio of 0.02 to 0.2 mole per mole of aryl compound, and contacting the said solution with an oxygen-containing gas having a partial pressure of oxygen of at least 0.85 atmosphere in the presence of 0.1 to 0.5 mole of a methylenic ketone per mole of aryl compound and at a temperature of 60° to 120° C.

2. In the process of claim 1, separating the solid carboxylic acid from the associated solution, replenishing the consumed chemicals of the solution by adding to the solution sufficient mono-aryl compound and methylenic ketone to attain the original concentration of the solution, and removing accumulated water from the solution as required to maintain the water content specified.

3. Process of forming terephthalic acid comprising providing a 0.1 to 3.0 molar solution of p-xylene in acetic acid, said solution initially containing water at a concentration of 0.5 to 5 molar and cobalt acetate at a ratio of 0.02 to 0.2 mole per mole of p-xylene, and contacting the said solution with an oxygen-containing gas having a partial pressure of oxygen at least 0.85 atmosphere in the presence of 0.1 to 0.5 mole of methyl ethyl ketone per mole of p-xylene and at a temperature of 70–100° C.

4. In the process of claim 3, introducing the oxygen-containing gas into the solution while the solution is agitated and heated to a temperature of about 90° C.

5. The process of forming terephthalic acid which comprises forming a solution in acetic acid including p-xylene at a concentration of 0.1 to 3.0 molar, water at a concentration of 0.5 to 5 molar, cobalt acetate at a mole ratio of 0.02 to 0.2 mole per mole of p-xylene, from 0.1 to 0.5 mole of methyl ethyl ketone per mole of p-xylene, and while agitating the solution at a temperature of from 70° to 100° C., introducing into the solution an oxygen-containing gas having a partial pressure of oxygen of at least 0.85 atmosphere at first for several hours at about 100° C. and then for a longer period at a temperature of from 70° to 80° C.

6. In a precess for forming an aromatic carboxylic acid by the catalytic oxidation of methyl substituted monoaryl compounds by means of gaseous oxygen in the presence of a cobalt salt, a minor proportion of water and a methylenic ketone initiator, the improvement which comprises initially reacting the oxygen with from 0.1 to about 3 moles of the mono-aryl compound in solution in a fatty acid having from two to four carbon atoms at a temperature of about 100° C. for several hours and then effecting a more extensive oxidation at a higher rate at a temperature of from 70° to 80° C.

7. Process of forming terephthalic acid comprising providing a 0.1 to 3.0 molar solution of p-xylene in acetic acid, said solution initially containing water at a concentration of 0.5 to 5 molar and cobalt acetate at a ratio of 0.02 to 0.2 mole per mole of p-xylene, and contacting the said solution in the presence of 0.1 to 0.5 mole of methyl ethyl ketone per mole of p-xylene with a stream of gas having a partial pressure of oxygen of at least 0.85 atmosphere, at first for several hours at about 100° C. and then for a longer period at about 70° to 80° C.

8. In the process of claim 3, separating the solid terephthalic acid from the associated solution, replenishing the consumed chemicals of the solution by adding to the solution sufficient p-xylene and methyl ethyl ketone to attain the original concentration of solution, and removing the accumulated water from the solution by evaporation to maintain the water content specified.

References Cited in the file of this patent

UNITED STATES PATENTS

| | | |
|---|---|---|
| 2,245,528 | Loder | June 10, 1941 |
| 2,479,067 | Gresham | Aug. 16, 1949 |
| 2,673,217 | Hull | Mar. 23, 1954 |
| 2,680,757 | Himel | June 8, 1954 |
| 2,723,994 | Haefele et al. | Nov. 15, 1955 |
| 2,727,921 | Taves | Dec. 20, 1955 |
| 2,746,990 | Fortuin et al. | May 22, 1956 |
| 2,813,119 | Taves | Nov. 12, 1957 |

UNITED STATES PATENT OFFICE
CERTIFICATE OF CORRECTION

September 23, 1958

Patent No. 2,853,514

William F. Brill

It is hereby certified that error appears in the printed specification of the above numbered patent requiring correction and that the said Letters Patent should read as corrected below.

Column 2, line 4, for "solution" read -- invention --; line 7, for "actalyst" read -- catalyst --; column 6, line 52, for "oxidaion" read -- oxidation --; column 10, line 36, for "precess" read -- process --.

Signed and sealed this 2nd day of December 1958.

(SEAL)
Attest:

KARL H. AXLINE
Attesting Officer

ROBERT C. WATSON
Commissioner of Patents